UNITED STATES PATENT OFFICE.

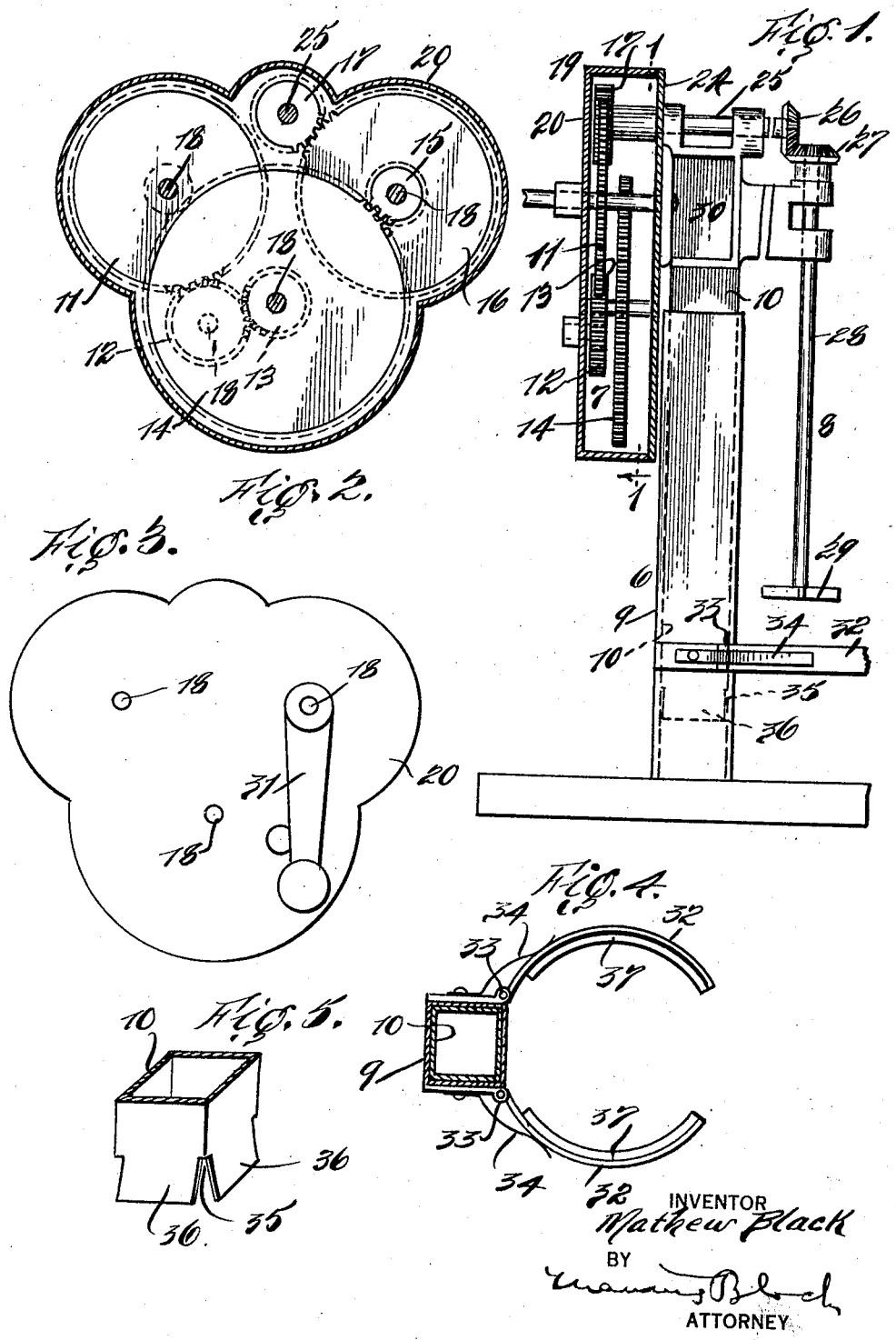

MATHEW BLACK, OF BROOKLYN, NEW YORK.

BEVERAGE-MIXER.

1,327,900.

Specification of Letters Patent.   Patented Jan. 13, 1920.

Application filed May 3, 1919. Serial No. 294,492.

*To all whom it may concern:*

Be it known that I, MATHEW BLACK, a citizen of the United States of America, residing at Brooklyn, Kings county, State of New York, have invented certain new and useful Improvements in Beverage-Mixers, of which the following is a full, clear, and exact description.

This invention relates to improvements in mixing devices of the variety employed to mix such beverages as malted milk, eggnog, etc. My mixer is, however, not limited to such use, as it may be employed by housewives to beat eggs or for other culinary purposes. One of the objects of my invention is to provide an inexpensive effective mixing apparatus which is manually operable.

I will now proceed to describe my invention in detail, the novel features of which I will fully claim, reference being had to the accompanying drawing, wherein:—

Figure 1 is a sectional side elevation, partly in elevation of a mixing device embodying my improvement;

Fig. 2 is a sectional view thereof, the section being taken on a line 1—1 in Fig. 2, looking in the direction of the arrow;

Fig. 3 is a fragmentary rear view thereof;

Fig. 4 is a sectional plan view of the standard, showing the hinged retainer for receptacles; and Fig. 5 is an enlarged fragmentary perspective view illustrating the lower end of the slidable post-member.

As herein embodied, my improvement consists of a standard member 6, a hand operated operating mechanism 7, and a rotatable mixer 8. The standard-member is made up of a tubular support 9 slidably engaged by a post 10 which carries the operating mechanism and mixer operated thereby. The operating mechanism consists of a train of intermeshing gears 11, 12, 13, 14, 15, 16 and 17. The gears 11 to 15, inclusive, carry short stub shafts 18 rotatably supported by a casing 19 comprising a box portion 20 and cover 24. The gear 17 is carried by a shaft 25 which at its outer end carries a bevel gear 26 meshing with a similar gear 27 carried by the spindle 28 of the mixer 8. A further element of the mixer consists of any suitable agitating element 29. The shaft 25 and spindle 28 are supported in bearings carried by a bracket 30 mounted at the upper end of the post 10. The bracket 30 also supports the casing 19. Thus the driving means acts as a balance for the agitator shaft and its connections to prevent cramping or binding of the post in its standard.

The gears and mixer are operated by means of a handle 31 secured to the outer end of the stub shaft 18 of the gear 11.

To retain a glass, bowl or other container in position relative to the mixer, I provide a clamping mechanism consisting of curved arms 32 hinged to the support 9 as at 33, said arms being normally forced toward each other by means of springs 34. To maintain the post-member 9 in adjusted positions longitudinally of the support 9, I slit said post-member, at its lower end, as at 35, to provide tongues 36 which are bent outwardly to firmly bear against the inner surface of the support 9. The tongues exert sufficient pressure upon the support 9, due to the resiliency thereof, to maintain the post-member and elements carried thereby in any adjusted position. In common parlance they are friction devices to maintain the post in adjusted positions. To mix a beverage or other compound, the post 10 will be raised and a glass, bowl or other container placed in the clamping device, after which the post will be lowered to cause the agitator to become positioned adjacent the bottom of the container, whereupon the handle 31 will be operated to rotate the gears and agitator. Owing to the relative diameters of the gears, the speed of the agitator will be relatively high. The mixer can be rotated in either direction by the proper manipulation of the handle 31. To obtain a high speed upon the part of the agitator, each gear operates a considerably smaller intermeshing gear, as can be seen in Fig. 2. The spindle 28 will be located far enough from the standard 6 to permit of the placing of a relatively large vessel in the clamping device. As the arms of the clamping device are pivoted and spring pressed, vessels of various sizes can be placed therein and held thereby. To increase the gripping effect, the arms 32 may be lined or faced with rubber or the like, indicated by 37.

Having described my invention, what I claim is:—

1. In beverage mixers and similar articles, a standard consisting of a fixed tubular support, a post extensibly sliding therein, a bracket mounted on the upper end of said post, an agitator and agitator shaft on said bracket at one side of said support, and a casing mounted on said bracket and containing means for driving said shaft and arranged on the opposite side of said support to act as a counterbalance to said shaft.

2. In beverage mixers and similar articles, a standard consisting of a fixed tubular support, a post extensibly sliding therein, a bracket mounted on the upper end of said post, an agitator and agitator shaft in said bracket at one side of said support and spaced sufficiently from the aforesaid standard to permit the operative positioning of a suitable container within which said agitator is adapted to operate, a shaft for driving said agitator shaft and extending through said bracket and across the upper end of said post to the opposite side thereof from the agitator shaft, a gear casing supported by said bracket in close proximity to the aforesaid post, and a train of multiplying gearing comprising a plurality of intermeshed gears arranged in two parallel planes in immediate proximity to each other, the whole casing and contained gearing affording a very compact element the entire weight of which is supported at a point very close to the supporting post thereby reducing the leverage so that it approximately counterbalances the aforesaid agitator and agitator shaft.

Signed at New York city, N. Y., this 2 day of May, 1919.

MATHEW BLACK.

Witnesses:
EDWARD A. JARVIS,
MAURICE BLOCK.